US006950567B2

(12) United States Patent
Kline

(10) Patent No.: US 6,950,567 B2
(45) Date of Patent: *Sep. 27, 2005

(54) METHOD AND APPARATUS FOR PROVIDING INDUCTIVE COUPLING AND DECOUPLING OF HIGH-FREQUENCY, HIGH-BANDWIDTH DATA SIGNALS DIRECTLY ON AND OFF OF A HIGH VOLTAGE POWER LINE

(75) Inventor: Paul A. Kline, Gaithersburg, MD (US)

(73) Assignee: Current Technologies, LLC, Germantown, MD (US)

( * ) Notice: Subject to any disclaimer, the term of this patent is extended or adjusted under 35 U.S.C. 154(b) by 21 days.

This patent is subject to a terminal disclaimer.

(21) Appl. No.: 10/429,338

(22) Filed: May 2, 2003

(65) Prior Publication Data

US 2003/0190110 A1 Oct. 9, 2003

Related U.S. Application Data

(63) Continuation of application No. 09/912,633, filed on Jul. 25, 2001.
(60) Provisional application No. 60/268,578, filed on Feb. 14, 2001.

(51) Int. Cl.$^7$ ............................. G02B 6/26; G02B 6/42
(52) U.S. Cl. ............... 385/15; 340/310.01; 340/310.07; 307/3; 455/402
(58) Field of Search ................................ 385/100–101, 385/15; 340/310.01, 310.07, 310.08; 307/3; 455/402; 333/24 R

(56) References Cited

U.S. PATENT DOCUMENTS

| 1,547,242 A | 7/1925 | Strieby ................... 340/310.03 |
| 2,298,435 A | 10/1942 | Tunick ........................ 250/15 |
| 2,577,731 A | 12/1951 | Berger ........................ 370/293 |
| 3,369,078 A | 2/1968 | Stradley ........................ 381/2 |
| 3,445,814 A | 5/1969 | Spalti ........................ 340/151 |

(Continued)

FOREIGN PATENT DOCUMENTS

| DE | 197 28 270 A1 | 1/1999 |
| DE | 100 08 602 A1 | 6/2001 |
| DE | 100 12 235 C2 | 12/2001 |

(Continued)

OTHER PUBLICATIONS

Plexeon Logistics, Inc., "Power Line Communications", www.plexeon.com/power.html.*
LONWORKS Engineering Bulletin, "Demand Side Management with LONWORKS® Power Line Transceivers," Dec. 1996, 36 pages.
HomePlug™Powerline Alliance, HomePlug Initial Draft Medium Interface Specification, May 19, 2000, 109 pages.

(Continued)

*Primary Examiner*—Leonidas Boutsikaris
(74) *Attorney, Agent, or Firm*—Mel Barnes; Manelli Dension & Selter, PLLC

(57) ABSTRACT

The present invention is drawn to an electrically "closed" method and apparatus for transmitting and receiving data signals over a high voltage power line. Inductive coupling is employed for coupling and decoupling the data signal directly on to and off of a single power line wire. An exemplary device includes a high frequency inductive coupling toroid for data signals, a second (50–60 Hz) inductive coupling toroid for providing power, signal conditioning electronics for the receive and transmit signal, a fiber optics interface for electrical isolation purposes, and a weatherproof enclosure. In a preferred embodiment, the toroids are hinged for ease of installation on a power line. A pair of such couplings on either side of a fiber-optic isolator can be used to bridge transformers.

44 Claims, 5 Drawing Sheets

U.S. PATENT DOCUMENTS

| | | | |
|---|---|---|---|
| 3,605,009 A | 9/1971 | Enge | 323/93 |
| 3,641,536 A | 2/1972 | Prosprich | 340/870.15 |
| 3,656,112 A | 4/1972 | Paull | 340/151 |
| 3,696,383 A | 10/1972 | Oishi et al. | 340/310 |
| 3,701,057 A | 10/1972 | Hoer | 333/112 |
| 3,702,460 A | 11/1972 | Blose | 340/150 |
| 3,810,096 A | 5/1974 | Kabat et al. | 340/147 R |
| 3,846,638 A | 11/1974 | Wetherell | 307/3 |
| 3,895,370 A | 7/1975 | Valentini | 340/310 |
| 3,900,842 A | 8/1975 | Calabro et al. | 340/310.03 |
| 3,911,415 A | 10/1975 | Whyte | 340/310 |
| 3,942,168 A | 3/1976 | Whyte | 340/310.01 |
| 3,942,170 A * | 3/1976 | Whyte | 340/310.07 |
| 3,962,547 A | 6/1976 | Pattantyus-Abraham | 179/2.5 R |
| 3,964,048 A | 6/1976 | Lusk et al. | 340/310 R |
| 3,967,264 A | 6/1976 | Whyte et al. | 340/310.08 |
| 3,973,087 A | 8/1976 | Fong | 340/310.06 |
| 3,973,240 A | 8/1976 | Fong | 340/151 |
| 4,004,110 A | 1/1977 | Whyte | 179/170 J |
| 4,004,257 A | 1/1977 | Geissler | 333/207 |
| 4,012,733 A | 3/1977 | Whyte | 340/310 |
| 4,016,429 A | 4/1977 | Vercellotti et al. | 307/149 |
| 4,017,845 A | 4/1977 | Kilian et al. | 340/310.02 |
| 4,053,876 A | 10/1977 | Taylor | 340/529 |
| 4,057,793 A | 11/1977 | Johnson et al. | 340/310 R |
| 4,060,735 A | 11/1977 | Pascucci et al. | 307/3 |
| 4,070,572 A * | 1/1978 | Summerhayes | 398/209 |
| 4,119,948 A | 10/1978 | Ward et al. | 340/870.02 |
| 4,142,178 A | 2/1979 | Whyte et al. | 340/310 |
| 4,188,619 A | 2/1980 | Perkins | 340/310 R |
| 4,239,940 A | 12/1980 | Dorfman | 179/2.51 |
| 4,250,489 A | 2/1981 | Dudash et al. | 340/147 T |
| 4,254,402 A | 3/1981 | Perkins | 340/310 R |
| 4,263,549 A | 4/1981 | Toppeto | 324/127 |
| 4,268,818 A | 5/1981 | Davis et al. | 340/870.38 |
| 4,323,882 A | 4/1982 | Gajjar | 340/310 R |
| 4,357,598 A | 11/1982 | Melvin, Jr. | 340/310 A |
| 4,359,644 A | 11/1982 | Foord | 307/40 |
| 4,367,522 A | 1/1983 | Forstbauer et al. | 363/137 |
| 4,383,243 A | 5/1983 | Krügel et al. | 340/310.02 |
| 4,386,436 A | 5/1983 | Kocher et al. | 455/151.4 |
| 4,408,186 A | 10/1983 | Howell | 340/310 A |
| 4,409,542 A | 10/1983 | Becker et al. | 324/548 |
| 4,413,250 A | 11/1983 | Porter et al. | 340/310.01 |
| 4,419,621 A | 12/1983 | Becker et al. | 324/548 |
| 4,433,284 A | 2/1984 | Perkins | 323/361 |
| 4,442,492 A | 4/1984 | Karlsson et al. | 364/464 |
| 4,457,014 A | 6/1984 | Bloy | 381/98 |
| 4,468,792 A | 8/1984 | Baker et al. | 375/45 |
| 4,471,399 A | 9/1984 | Udren | 361/64 |
| 4,473,816 A | 9/1984 | Perkins | 340/310 |
| 4,473,817 A | 9/1984 | Perkins | 340/310 |
| 4,475,209 A | 10/1984 | Udren | 375/214 |
| 4,479,033 A | 10/1984 | Brown et al. | 455/402 |
| 4,481,501 A | 11/1984 | Perkins | 340/310 |
| 4,495,386 A | 1/1985 | Brown et al. | 455/402 |
| 4,504,705 A | 3/1985 | Pilloud | 381/77 |
| 4,517,548 A | 5/1985 | Ise et al. | 340/310.06 |
| 4,569,045 A | 2/1986 | Schieble et al. | 370/85 |
| 4,599,598 A | 7/1986 | Komoda et al. | 340/310.02 |
| 4,636,771 A | 1/1987 | Ochs | 340/310.05 |
| 4,638,298 A | 1/1987 | Spiro | 370/392 |
| 4,642,607 A | 2/1987 | Strom et al. | 340 |
| 4,644,321 A | 2/1987 | Kennon | 340/310 A |
| 4,652,855 A | 3/1987 | Weikel | 340/310 |
| 4,668,934 A | 5/1987 | Shuey | 340/310.06 |
| 4,675,648 A | 6/1987 | Roth et al. | 340/310.07 |
| 4,683,450 A | 7/1987 | Max et al. | 333/202 |
| 4,686,382 A | 8/1987 | Shuey | 307/149 |
| 4,686,641 A | 8/1987 | Evans | 364/580 |
| 4,697,166 A | 9/1987 | Warnagiris et al. | 340/310 R |
| 4,701,945 A | 10/1987 | Pedigo | 455/402 |
| 4,724,381 A | 2/1988 | Crimmins | 324/127 |
| 4,745,391 A | 5/1988 | Gajjar | 340/310 A |
| 4,746,897 A | 5/1988 | Shuey | 340/310 R |
| 4,749,992 A | 6/1988 | Fitzmeyer et al. | 340/870.02 |
| 4,766,414 A | 8/1988 | Shuey | 340/310 A |
| 4,772,870 A | 9/1988 | Reyes | 340/310 R |
| 4,785,195 A | 11/1988 | Rochelle et al. | 307/18 |
| 4,800,363 A | 1/1989 | Braun et al. | 340/310 A |
| 4,815,106 A | 3/1989 | Propp et al. | 375/257 |
| 4,835,517 A | 5/1989 | van der Gracht et al. | 340/310 A |
| 4,890,089 A | 12/1989 | Shuey | 340/310.07 |
| 4,903,006 A | 2/1990 | Boomgaard | 340/310 A |
| 4,904,996 A | 2/1990 | Fernandes | 340/870.07 |
| 4,912,553 A | 3/1990 | Pal et al. | 725/79 |
| 4,962,496 A | 10/1990 | Vercellotti et al. | 370/204 |
| 4,973,940 A | 11/1990 | Sakai et al. | 340/310 R |
| 4,979,183 A | 12/1990 | Cowart | 375/142 |
| 5,006,846 A | 4/1991 | Granville et al. | 340/870.28 |
| 5,066,939 A * | 11/1991 | Mansfield, Jr. | 340/310.06 |
| 5,068,890 A | 11/1991 | Nilssen | 379/90 |
| 5,132,992 A | 7/1992 | Yurt et al. | 375/240 |
| 5,148,144 A | 9/1992 | Sutterlin et al. | 340/310 A |
| 5,151,838 A | 9/1992 | Dockery | 340/310 R |
| 5,185,591 A | 2/1993 | Shuey | 340/310 A |
| 5,191,467 A | 3/1993 | Kapany et al. | 359/341 |
| 5,210,519 A | 5/1993 | Moore | 340/310 |
| 5,257,006 A | 10/1993 | Graham et al. | 340/310 A |
| 5,264,823 A | 11/1993 | Stevens | 340/310.04 |
| 5,272,462 A | 12/1993 | Teyssandier et al. | 340/310.01 |
| 5,301,208 A | 4/1994 | Rhodes | 375/36 |
| 5,319,634 A | 6/1994 | Bartholomew et al. | 370/18 |
| 5,341,265 A | 8/1994 | Westrom et al. | 361/44 |
| 5,351,272 A | 9/1994 | Abraham | 375/38 |
| 5,355,109 A | 10/1994 | Yamazaki | 336/92 |
| 5,359,625 A | 10/1994 | Vander Mey et al. | 375/1 |
| 5,369,356 A | 11/1994 | Kinney et al. | 324/142 |
| 5,375,141 A | 12/1994 | Takahashi | 375/1 |
| 5,406,249 A | 4/1995 | Pettus | 340/310.06 |
| 5,410,720 A | 4/1995 | Osterman | 725/150 |
| 5,426,360 A | 6/1995 | Maraio et al. | 324/126 |
| 5,432,841 A | 7/1995 | Rimer | 455/457 |
| 5,448,229 A | 9/1995 | Lee, Jr. | 340/870.02 |
| 5,461,629 A | 10/1995 | Sutterlin et al. | 371/30 |
| 5,477,091 A | 12/1995 | Fiorina et al. | 307/66 |
| 5,481,249 A | 1/1996 | Sato | 340/2.1 |
| 5,485,040 A | 1/1996 | Sutterlin | 307/3 |
| 5,497,142 A | 3/1996 | Chaffanjon | 340/310.06 |
| 5,498,956 A | 3/1996 | Kinney et al. | 324/142 |
| 4,749,992 A | 6/1996 | Fitzmeyer et al. | 340/870.02 |
| 5,533,054 A | 7/1996 | DeAndrea et al. | 375/286 |
| 5,537,087 A | 7/1996 | Naito | 336/92 |
| 5,559,377 A | 9/1996 | Abraham | 307/104 |
| 5,568,185 A | 10/1996 | Yoshikazu | 348/22 |
| 5,579,221 A | 11/1996 | Mun | 364/188 |
| 5,579,335 A | 11/1996 | Sutterlin et al. | 375/200 |
| 5,592,354 A | 1/1997 | Nocentino, Jr. | 361/69 |
| 5,592,482 A | 1/1997 | Abraham | 348/8 |
| 5,598,406 A | 1/1997 | Albrecht et al. | 370/296 |
| 5,616,969 A | 4/1997 | Morava | 307/91 |
| 5,625,863 A | 4/1997 | Abraham | 455/3.3 |
| 5,630,204 A | 5/1997 | Hylton et al. | 455/3.3 |
| 5,640,416 A | 6/1997 | Chalmers | 375/147 |
| 5,664,002 A | 9/1997 | Skinner, Sr. | 379/56.2 |
| 5,684,450 A | 11/1997 | Brown | 340/310.02 |
| 5,691,691 A | 11/1997 | Merwin et al. | 340/310.02 |
| 5,694,108 A | 12/1997 | Shuey | 340/310.01 |
| 5,705,974 A | 1/1998 | Patel et al. | 340/310.08 |

| | | | |
|---|---|---|---|
| 5,712,614 A | 1/1998 | Patel et al. ............. 340/310.03 |
| 5,717,685 A | 2/1998 | Abraham ..................... 370/30 |
| 5,726,980 A | 3/1998 | Rickard ..................... 370/293 |
| 5,748,104 A | 5/1998 | Argyroudis et al. ... 340/870.11 |
| 5,748,671 A | 5/1998 | Sutterlin et al. ............ 375/206 |
| 5,751,803 A | 5/1998 | Shpater ..................... 379/379 |
| 5,770,996 A | 6/1998 | Severson et al. ...... 340/310.08 |
| 5,774,526 A | 6/1998 | Propp et al. ............... 379/90.1 |
| 5,777,544 A | 7/1998 | Vander Mey et al. ... 340/310.06 |
| 5,777,545 A | 7/1998 | Patel et al. ............. 341/310.06 |
| 5,777,769 A | 7/1998 | Coutinho .................... 359/173 |
| 5,778,116 A | 7/1998 | Tomich ........................ 385/16 |
| 5,796,607 A | 8/1998 | Le Van Suu ........... 364/140.01 |
| 5,798,913 A | 8/1998 | Tiesinga et al. ......... 363/21.13 |
| 5,801,643 A | 9/1998 | Williams et al. ....... 340/870.02 |
| 5,802,102 A | 9/1998 | Davidovici ................. 375/152 |
| 5,805,053 A | 9/1998 | Patel et al. .............. 340/310.01 |
| 5,805,458 A | 9/1998 | McNamara et al. .......... 702/60 |
| 5,818,127 A * | 10/1998 | Abraham .................... 307/106 |
| 5,818,821 A | 10/1998 | Schurig ....................... 370/293 |
| 5,828,293 A | 10/1998 | Rickard ................. 340/310.04 |
| 5,835,005 A | 11/1998 | Furukawa et al. ..... 340/310.01 |
| 5,847,447 A | 12/1998 | Rozin et al. ................ 257/678 |
| 5,850,114 A | 12/1998 | Froidevaux ................. 307/105 |
| 5,856,776 A | 1/1999 | Armstrong et al. .... 340/310.01 |
| 5,864,284 A | 1/1999 | Sanderson et al. ..... 340/310.01 |
| 5,870,016 A | 2/1999 | Shresthe ................. 340/310.01 |
| 5,880,677 A | 3/1999 | Lestician ............... 340/825.06 |
| 5,881,098 A | 3/1999 | Tzou .......................... 375/152 |
| 5,892,430 A | 4/1999 | Wiesman et al. ...... 340/310.01 |
| 5,892,758 A | 4/1999 | Argyroudis ................. 370/335 |
| 5,929,750 A | 7/1999 | Brown ................... 340/310.02 |
| 5,933,071 A | 8/1999 | Brown ................... 340/310.01 |
| 5,933,073 A | 8/1999 | Shuey ................... 340/310.07 |
| 5,937,003 A | 8/1999 | Sutterlin et al. ............ 375/208 |
| 5,937,342 A | 8/1999 | Kline .......................... 455/402 |
| 5,949,327 A | 9/1999 | Brown ................... 340/310.01 |
| 5,952,914 A | 9/1999 | Wynn ..................... 340/310.01 |
| 5,963,585 A | 10/1999 | Omura et al. ............... 375/207 |
| 5,977,650 A | 11/1999 | Rickard et al. ................ 307/3 |
| 5,978,371 A | 11/1999 | Mason, Jr. et al. ......... 370/389 |
| 5,982,276 A | 11/1999 | Stewart ................. 340/310.01 |
| 5,994,998 A | 11/1999 | Fisher et al. ........... 340/310.01 |
| 5,994,999 A | 11/1999 | Ebersohl ................ 340/310.01 |
| 6,014,386 A | 1/2000 | Abraham .................... 370/485 |
| 6,023,106 A | 2/2000 | Abraham ...................... 307/3 |
| 6,037,678 A | 3/2000 | Rickard ....................... 307/89 |
| 6,037,857 A | 3/2000 | Behrens et al. ......... 340/310.03 |
| 6,040,759 A | 3/2000 | Sanderson ............. 340/310.01 |
| 6,091,932 A | 7/2000 | Langlais ..................... 455/5.1 |
| 6,104,707 A | 8/2000 | Abraham .................... 370/295 |
| 6,121,765 A | 9/2000 | Carlson ....................... 323/359 |
| 6,130,896 A | 10/2000 | Lueker et al. ............... 370/469 |
| 6,140,911 A | 10/2000 | Fisher et al. ........... 340/310.01 |
| 6,141,634 A | 10/2000 | Flint et al. .................... 703/18 |
| 6,144,292 A | 11/2000 | Brown ................... 340/310.02 |
| 6,151,330 A | 11/2000 | Liberman ................... 370/449 |
| 6,151,480 A | 11/2000 | Fischer et al. .......... 340/310.01 |
| 6,154,488 A | 11/2000 | Hunt ........................... 375/219 |
| 6,157,292 A | 12/2000 | Piercy et al. ........... 340/310.01 |
| 6,172,597 B1 | 1/2001 | Brown ................... 340/310.02 |
| 6,175,860 B1 | 1/2001 | Gaucher ...................... 709/208 |
| 6,177,849 B1 | 1/2001 | Barsellotti et al. .......... 333/177 |
| 6,212,658 B1 | 4/2001 | Le Van Suu ................ 714/749 |
| 6,226,166 B1 | 5/2001 | Gumley et al. ............. 361/118 |
| 6,229,434 B1 | 5/2001 | Knapp et al. ........... 340/310.01 |
| 6,239,722 B1 | 5/2001 | Colton et al. .......... 340/870.02 |
| 6,243,413 B1 | 6/2001 | Beukema .................... 375/222 |
| 6,243,571 B1 | 6/2001 | Bullock et al. ............. 455/402 |
| 6,255,805 B1 | 7/2001 | Papalia et al. .............. 323/207 |
| 6,255,935 B1 | 7/2001 | Lehmann et al. ....... 340/310.07 |
| 6,275,144 B1 | 8/2001 | Rumbaugh ............. 340/310.01 |
| 6,282,405 B1 | 8/2001 | Brown ......................... 725/79 |
| 6,297,729 B1 | 10/2001 | Abali et al. ............ 340/310.01 |
| 6,297,730 B1 | 10/2001 | Dickinson .............. 340/310.01 |
| 6,300,881 B1 | 10/2001 | Yee et al. ............... 340/870.02 |
| 6,313,738 B1 | 11/2001 | Wynn ..................... 340/310.03 |
| 6,317,031 B1 | 11/2001 | Rickard ................. 340/310.03 |
| 6,331,814 B1 | 12/2001 | Albano et al. .......... 340/310.01 |
| 6,335,672 B1 | 1/2002 | Tumlin et al. ............... 336/175 |
| 6,373,376 B1 | 4/2002 | Adams et al. .......... 340/310.01 |
| 6,384,580 B1 | 5/2002 | Ochoa et al. ............... 323/207 |
| 6,396,391 B1 | 5/2002 | Binder .................... 340/310.01 |
| 6,396,392 B1 | 5/2002 | Abraham ............... 340/310.01 |
| 6,404,773 B1 | 6/2002 | Williams et al. ............ 370/463 |
| 6,407,987 B1 | 6/2002 | Abraham .................... 370/295 |
| 6,414,578 B1 | 7/2002 | Jitaru ........................ 336/170 |
| 6,417,762 B1 | 7/2002 | Comer ................... 340/310.01 |
| 6,425,852 B1 | 7/2002 | Epstein et al. ............... 600/13 |
| 6,441,723 B1 | 8/2002 | Mansfield, Jr. et al. . 340/310.01 |
| 6,449,318 B1 | 9/2002 | Rumbaugh .................. 375/309 |
| 6,452,482 B1 | 9/2002 | Cern ...................... 340/310.01 |
| 6,480,510 B1 | 11/2002 | Binder ........................ 370/502 |
| 6,486,747 B1 | 11/2002 | DeCramer et al. ............ 333/25 |
| 6,492,897 B1 | 12/2002 | Mowery, Jr. ........... 340/310.01 |
| 6,496,104 B2 | 12/2002 | Kline ..................... 340/310.01 |
| 6,504,357 B1 | 1/2003 | Hemminger et al. ... 340/310.01 |
| 6,507,573 B1 | 1/2003 | Lukanek et al. ............ 370/335 |
| 6,515,485 B1 | 2/2003 | Bullock et al. ............. 324/601 |
| 6,522,626 B1 | 2/2003 | Greenwood ................. 370/208 |
| 6,522,650 B1 | 2/2003 | Yonge, III et al. .......... 370/390 |
| 6,549,120 B1 | 4/2003 | deBuda .................. 340/310.01 |
| 6,577,231 B2 | 6/2003 | Litwin, Jr. et al. ...... 340/310.01 |
| 6,590,493 B1 | 7/2003 | Rasimas ................. 340/310.01 |
| 6,611,134 B2 | 8/2003 | Chung .......................... 324/74 |
| 6,624,532 B1 | 9/2003 | Davidow et al. ............. 307/39 |
| 6,646,447 B2 | 11/2003 | Cern et al. ................... 324/539 |
| 6,650,249 B2 | 11/2003 | Meyer et al. .......... 340/870.02 |
| 6,667,685 B2 | 12/2003 | Wasaki et al. ......... 340/310.03 |
| 6,668,058 B2 | 12/2003 | Grimes ....................... 379/322 |
| 6,683,531 B2 | 1/2004 | Diamanti et al. ...... 340/310.01 |
| 6,686,832 B2 | 2/2004 | Abraham ............... 340/310.01 |
| 6,696,925 B1 | 2/2004 | Aiello, Jr. .............. 340/310.01 |
| 6,753,742 B2 | 6/2004 | Kim et al. ................ 333/24 R |
| 6,785,532 B1 | 8/2004 | Rickard ....................... 455/402 |
| 6,785,592 B1 | 8/2004 | Smith et al. ................ 700/291 |
| 6,788,745 B1 | 9/2004 | Lim et al. ................... 375/297 |
| 6,844,809 B2 | 1/2005 | Manis et al. ........... 340/310.02 |
| 2001/0038329 A1 | 11/2001 | Diamanti et al. ...... 340/310.01 |
| 2001/0038343 A1 | 11/2001 | Meyer et al. .......... 340/870.02 |
| 2001/0045888 A1 | 11/2001 | Kline ..................... 340/310.01 |
| 2001/0052843 A1 | 12/2001 | Wiesman et al. ...... 340/310.01 |
| 2001/0054953 A1 | 12/2001 | Kline ..................... 340/310.01 |
| 2002/0002040 A1 | 1/2002 | Kline et al. ................. 455/402 |
| 2002/0010870 A1 | 1/2002 | Gardner ...................... 713/300 |
| 2002/0014884 A1 | 2/2002 | Chung .......................... 324/74 |
| 2002/0027496 A1 | 3/2002 | Cern ...................... 340/310.01 |
| 2002/0041228 A1 | 4/2002 | Zhang .................... 340/310.01 |
| 2002/0048368 A1 | 4/2002 | Gardner ...................... 380/277 |
| 2002/0060624 A1 | 5/2002 | Zhang .................... 340/310.01 |
| 2002/0071452 A1 | 6/2002 | Abraham .................... 370/480 |
| 2002/0080010 A1 | 6/2002 | Zhang .................... 340/310.06 |
| 2002/0095662 A1 | 7/2002 | Ashlock et al. ............. 717/136 |
| 2002/0097953 A1 | 7/2002 | Kline ............................ 385/24 |
| 2002/0098867 A1 | 7/2002 | Meiksen et al. ............ 455/560 |
| 2002/0098868 A1 | 7/2002 | Meiksen et al. ............ 455/560 |
| 2002/0105413 A1 * | 8/2002 | Cern et al. ............. 340/310.01 |
| 2002/0110310 A1 | 8/2002 | Kline ............................ 385/15 |
| 2002/0110311 A1 | 8/2002 | Kline ............................ 385/15 |
| 2002/0118101 A1 | 8/2002 | Kline ..................... 340/310.01 |
| 2002/0121963 A1 | 9/2002 | Kline ..................... 340/310.01 |
| 2002/0140547 A1 | 10/2002 | Litwin, Jr. et al. ...... 340/310.01 |

| Pub. No. | Date | Inventor | Class |
|---|---|---|---|
| 2002/0154000 A1 | 10/2002 | Kline | 340/310.01 |
| 2002/0171535 A1 | 11/2002 | Cern | 340/310.07 |
| 2003/0007570 A1 | 1/2003 | Kim et al. | 375/329 |
| 2003/0007576 A1 | 1/2003 | Alavi et al. | 375/329 |
| 2003/0062990 A1 | 4/2003 | Schaeffer, Jr. et al. | 340/310.01 |
| 2003/0067910 A1 | 4/2003 | Razazian et al. | 370/352 |
| 2003/0103307 A1 | 6/2003 | Dostert | 361/113 |
| 2003/0107477 A1 | 6/2003 | Ide | 340/310.01 |
| 2003/0129978 A1 | 7/2003 | Akiyama et al. | 455/426.1 |
| 2003/0149784 A1 | 8/2003 | Ide | 709/231 |
| 2003/0160684 A1 | 8/2003 | Cern | 340/310.01 |
| 2003/0169155 A1 | 9/2003 | Mollenkopf et al. | 310/310.01 |
| 2003/0179080 A1 | 9/2003 | Mollenkopf et al. | 340/310.01 |
| 2003/0184433 A1 | 10/2003 | Zalitzky et al. | 310/310.06 |
| 2003/0201759 A1 | 10/2003 | Cern | 323/247 |
| 2003/0201873 A1 | 10/2003 | Cern | 340/310.07 |
| 2003/0210135 A1 | 11/2003 | Cern | 340/310.07 |
| 2003/0210734 A1 | 11/2003 | Kaku | 375/148 |
| 2003/0222747 A1 | 12/2003 | Perkinson et al. | 336/178 |
| 2003/0222748 A1 | 12/2003 | Cern et al. | 336/178 |
| 2003/0227373 A1 | 12/2003 | Lou et al. | 340/310.01 |
| 2003/0232599 A1 | 12/2003 | Dostert | 455/66.1 |
| 2003/0234713 A1 | 12/2003 | Pridmore, Jr. et al. | 336/82 |
| 2004/0001438 A1 | 1/2004 | Aretz | 370/232 |
| 2004/0001499 A1 | 1/2004 | Patella et al. | 370/412 |
| 2004/0003934 A1 | 1/2004 | Cope | 174/36 |
| 2004/0037317 A1 | 2/2004 | Zalitzky et al. | 370/466 |
| 2004/0054425 A1 | 3/2004 | Elmore | 700/1 |
| 2004/0064782 A1 | 4/2004 | Lerner et al. | 714/800 |
| 2004/0067745 A1 | 4/2004 | Belsak | 455/402 |
| 2004/0070912 A1 | 4/2004 | Kopp | 361/119 |
| 2004/0083066 A1 | 4/2004 | Hayes et al. | 702/62 |
| 2004/0113756 A1 | 6/2004 | Mollenkopf | 340/310.01 |
| 2004/0142599 A1 | 7/2004 | Cope et al. | 439/620 |
| 2004/0227621 A1 | 11/2004 | Cope et al. | 340/310.01 |

FOREIGN PATENT DOCUMENTS

| | | |
|---|---|---|
| DE | 100 47 648 A1 | 4/2002 |
| DE | 100 61 584 A1 | 6/2002 |
| DE | 100 61 586 A1 | 6/2002 |
| DE | 101 00 181 A1 | 7/2002 |
| DE | 101 03 530 A1 | 8/2002 |
| DE | 100 59 564 A1 | 9/2002 |
| DE | 100 48 348 C2 | 11/2002 |
| DE | 101 190 039 A1 | 12/2002 |
| DE | 101 190 040 A1 | 12/2002 |
| DE | 100 26 930 C2 | 1/2003 |
| DE | 100 26 931 C2 | 1/2003 |
| DE | 100 42 958 C2 | 1/2003 |
| DE | 101 47 918 A1 | 4/2003 |
| DE | 101 47 916 C1 | 5/2003 |
| DE | 101 46 982 C1 | 6/2003 |
| DE | 101 47 915 C1 | 6/2003 |
| DE | 101 47 913 C1 | 7/2003 |
| EP | 0 141 673 A2 | 5/1985 |
| EP | 0 581 351 A1 | 2/1994 |
| EP | 0 632 602 A2 | 1/1995 |
| EP | 0 470 185 B1 | 11/1995 |
| EP | 0 822 721 A2 | 2/1998 |
| EP | 0 822 721 A3 | 2/1998 |
| EP | 0 913 955 A2 | 5/1999 |
| EP | 0 933 883 A3 | 8/1999 |
| EP | 0 933 883 A2 | 8/1999 |
| EP | 0 948 143 A2 | 10/1999 |
| EP | 0 959 569 A1 | 11/1999 |
| EP | 1 011 235 A2 | 6/2000 |
| EP | 1011235 * | 6/2000 |
| EP | 1 014 640 A2 | 6/2000 |
| EP | 1 043 866 A2 | 10/2000 |
| EP | 1 043 866 A3 | 10/2000 |
| EP | 1 075 091 A1 | 2/2001 |
| EP | 0 916 194 B1 | 9/2001 |
| EP | 1 011 235 A3 | 5/2002 |
| EP | 1 213 849 A1 | 6/2002 |
| EP | 1 217 760 A1 | 6/2002 |
| EP | 1 014 640 A3 | 7/2002 |
| EP | 1 021 866 B1 | 10/2002 |
| EP | 1 251 646 A2 | 10/2002 |
| EP | 1 253 699 A2 | 10/2002 |
| ES | 2 122 920 A1 | 12/1998 |
| FR | 2 326 087 | 7/1976 |
| GB | 1 548 652 | 7/1979 |
| GB | 2 101 857 A | 1/1983 |
| GB | 2 293 950 A | 4/1996 |
| GB | 2 315 937 A | 2/1998 |
| GB | 2 331 683 A | 5/1999 |
| GB | 2 335 335 A | 9/1999 |
| GB | 2 341 776 A | 3/2000 |
| GB | 2 342 264 A | 4/2000 |
| GB | 2 347 601 A | 9/2000 |
| JP | 1276933 | 11/1989 |
| NZ | 276741 | 7/1998 |
| WO | 84/01481 A1 | 4/1984 |
| WO | 90/13950 A2 | 11/1990 |
| WO | 92/16920 A1 | 10/1992 |
| WO | 93/07693 A1 | 4/1993 |
| WO | 95/29536 A1 | 11/1995 |
| WO | 98/01905 A1 | 1/1998 |
| WO | 98/33258 A3 | 7/1998 |
| WO | 98/33258 A2 | 7/1998 |
| WO | 98/40980 A1 | 9/1998 |
| WO | 99/59261 A1 | 11/1999 |
| WO | 00/16496 A2 | 3/2000 |
| WO | 00/59076 A1 | 10/2000 |
| WO | 00/60701 A1 | 10/2000 |
| WO | 00/60822 A1 | 10/2000 |
| WO | 01/08321 A1 | 2/2001 |
| WO | 01/43305 A1 | 6/2001 |
| WO | 01/50625 A3 | 7/2001 |
| WO | 01/50625 A2 | 7/2001 |
| WO | 01/50628 A1 | 7/2001 |
| WO | 01/50629 A1 | 7/2001 |
| WO | 01/63787 A1 | 8/2001 |
| WO | 01/82497 A1 | 11/2001 |
| WO | 02/17509 A1 | 2/2002 |
| WO | 02/37712 A1 | 5/2002 |
| WO | 02/054605 A1 | 7/2002 |
| WO | 02/065684 A2 | 8/2002 |
| WO | 02/089352 A1 | 11/2002 |
| WO | 02/089353 A1 | 11/2002 |
| WO | 03/009083 A2 | 1/2003 |
| WO | 03/010896 A1 | 2/2003 |
| WO | 03/30396 A2 | 4/2003 |
| WO | 03/009083 A3 | 4/2003 |
| WO | 03/034608 A2 | 4/2003 |
| WO | 03/039022 A1 | 5/2003 |
| WO | 03/040732 A2 | 5/2003 |
| WO | 03/056715 A1 | 7/2003 |
| WO | 2004/008656 A1 | 1/2004 |
| WO | 2004/021600 A1 | 3/2004 |

OTHER PUBLICATIONS

HomePlug™ Powerline Alliance, HomePlug 0.5 Draft Medium Interface Specification, Nov. 28, 2000, 133 pages.

HomePlug™ Powerline Alliance, HomePlug Initial Draft Medium Interface Specification, Jul. 27, 2000, 109 pages.

HomePlug™ Powerline Alliance, HomePlug 1.01 Specification, Dec. 1, 2001, 139 pages.

Summary of an IEEE Guide for Power–Line Carrier Applications, A Report by the Power System Communications Committee, *IEEE Transactions on Power Apparatus and Systems*, vol. PAS–99, No. 6, Nov./Dec. 1980, pp. 2334–2337.

De Wilde, W. R. et al., "Upwards to a Reliable Bi–Directional Communication Link on the LV Power Supplies for Utility Services: Field Tests in Belgium," Apr. 3–5 1990, *Sixth International Conference on,* Manchester, UK, pp. 168–172.

Tanaka, M., "Transmission Characteristics of a Power Line Used for Data Communications at High Frequencies," IEEE Transactions on Consumer Electronics, Feb. 1989, vol. 35, No. 1, pp. 37–42.

Hasler, E. F. et al., "Communication Systems Using Bundle Conductor Overhead Power Lines," IEEE Transactions on Power Apparatus and Systems, Mar./Apr. 1975, vol. PAS–94, No. 2, pp. 344–349.

IEEE Guide for Power–Line Carrier Applications, ANSI/IEEE Std 643–1980, ©1980 by The Institute of Electrical and Electronics Engineers, Inc., pp. 1–80.

Hatori, M. et al., "Home Informatization and Standardization of Home Bus," IEEE Transactions on Consumer Electronics, Aug. 1986, vol. CE–32, No. 3, pp. 542–549.

Hunt, J. M. et al., "Electrical Energy Monitoring and Control System for the Home," IEEE Transactions on Consumer Electronics, Aug. 1986, vol. CE–32, No. 3, pp. 578–583.

Gutzwiller, F. W. et al., "Homenet: A Control Network for Consumer Applications," IEEE Transactions on Consumer Electronics, Aug. 1983, vol. CE–29, No. 3, pp. 297–304.

Burrascano, P. et al., "Digital Signal Transmission on Power Line Carrier Channels: An Introduction," IEEE Transactions on Power Delivery, Jan. 1987, vol. PWRD–2, No. 1, pp. 50–56.

Burr, A. G. et al., "Effect of HF Broadcast Interference on PowerLine Telecommunications Above 1 Mhz," ©1998 IEEE, pp. 2870–2875.

Onunga, J. et al., "Distribution Line Communications Using CSMA Access Control with Priority Acknowledgements," IEEE Transactions on Power Delivery, Apr. 1989, vol. 4, No. 2, pp. 878–886.

Tanaka, M., "High Frequency Noise Power Spectrum, Impedance and Transmission Loss of Power Line in Japan on Intrabuilding Power Line Communications," IEEE Transactions on Consumer Electronics, May 1988, vol. 34, No. 2, pp. 321–326.

Meng, H. et al., "A Transmission Line Model for High–Frequency Power Line Communication Channel," ©2002, IEEE, pp. 1290–1295.

Burrascano, P. et al., "Performance Evaluation of Digital Signal Transmission Channels on Coronating Power Lines," ©1988 IEEE, pp. 365–368.

DiClementi, D. A. et al., "Electrical Distribution System Power Line Characterization," ©1996 IEEE, pp. 271–276.

Abraham, K. C. et al., "A Novel High–Speed PLC Communication Modem," IEEE Transactions on Power Delivery, Oct. 1992, vol. 7, No. 4, pp. 1760–1768.

Yoshitoshi, M. et al., "Proposed Interface Specifications for Home Bus," IEEE Transactions on Consumer Electronics, Aug. 1986, vol. CE–32, No. 3, pp. 550–557.

O'Neal, Jr., J.B., "The Residential Power Circuit as a Communication Medium," IEEE Transactions on Consumer Electronics, Aug. 1986, vol. CE–32, No. 3, pp. 567–577.

Dostert, K., "EMC Aspects of High Speed Powerline Communications," Proceedings of the $15^{th}$ International Wroclaw Symposium and Exhibition on Electromagnetic Capability, Jun. 27–30, 2000; Wroclaw, Poland, pp. 98–102.

Piety, R. A., "Intrabuilding Data Transmission Using Power–Line Wiring," Hewlett–Packard Journal, May 1987, pp. 35–40.

Dostert, K., Powerline Communications, Ch. 5, pp. 286, 288–292, Prentice Hall PTR, Upper Saddle River, NJ ©2001.

Liu, E. et al., "Broadband Characterization of Indoor Powerline Channel," Communications Laboratory, Helsinki University of Technology, Finland [presented at the 2004 International Symposium on PowerLine Communications and its Applications, Zaragoza, Spain. Mar. 31–Apr. 2, 2004] 6 pages.

"ABB joins Main.net's subsidiary, PPC, as shareholder and strategic partner for Power Line Communications," Mannheim, Germany/Kfar Saba, Israel, Oct. 8th, 2002, 2 pages.

Tohoku Electric Power, Co., Inc., "Tohoku Electric Develops High–Speed Communications System Using Power Distribution Lines,"*Tohoku Currents,* Spring 1998, 8(1), 2 pages (http://www.tohokuepco.co.jp/profil/kurozuc_vol8_1/art04.htm).

Power Line Communications Conference entitled, "PLC, A New Competitor in Broadband Internet Access," Dec. 11–12, 2001, Washington, D.C., 60 pages.

Patent Abstracts of Japan, Japanese Publication No. 10200544 A2, published Jul. 31, 1998, (Matsushita Electric Works, LTD).

Rivkin, S. R., "Co–Evolution of Electric & Telecommunications Networks," *The Electricity Journal,* May 1998, 71–76.

Marketing Assessment Presentation entitled "Powerline Telecommunications," The Shpigler Group for CITI PLT, Jul. 16, 2002, 9 pages.

Campbell, C., presentation entitled "Building a Business Case for PLC: Lessons Learned From the Communication Industry Trenches," KPMG Consulting, Jul. 16, 2002, 5 pages.

"Embedded Power Line Carrier Modem," Archnet Electronic Technology, http://www.archnetco.com/english/product/ATL90.htm, 2001, 3 pages.

"Archnet: Automatic Meter Reading System Power Line Carrier Communication", www.archnetco.com/english/product/product_sl.htm, 3 pages.

"Power Line Communications Solutions", www.echelon.com/products/oem/transceivers/powerline/default.htm, 2 pages.

"Texas Instruments: System Block Diagrams; Power Line Communication (Generic)", http://focus.ti.com/docs/apps/catalog/resources/blockdiagram.jhtml?bdId=638, 1 page.

Feduschak, N.A., "Waiting in the Wings: Is Powerline Technology Ready to Compete with Cable?", Mar. 2001, www.cabletoday.com/ic2/archives/0301/0301powerline.htm, 5 pages.

"Signalling on Low–Voltage Electrical Installations in the Frequency Band 3kHz to 148.5kHz–Part 4: Filters at the Interface of the Indoor and Outdoor Electricity Network", *CLC SC 105A (Secretariat)* May 1992, 62, 1–11.

"Intellon Corporation Test Summary for Transformerless Coupler Study", *Intellon No News Wires,* Dec. 24, 1998, DOT/NHTSA Order No. DTNH22–98–P–07632, pp. 1–18.

EMETCON *Automated Distribution System,* ABB Power T & D Company, Inc., Jan. 1990, Raleigh, North Carolina, No. B–919A, 14 pages.

"Dedicated Passive Backbone for Power Line Communications", *IBM Technical Disclosure Bulletin,* Jul. 1997, 40(7), 183–185.

Coaxial Feeder Cables [Engineering Notes], *PYE Telecommunications Limited Publication Ref No. TSP507/1,* Jun. 1975, Cambridge, England, 15 pages.

"Centralized Commercial Building Applications with the Lonworks ® PLT–21 Power Line Transceiver ", *Lonworks Engineering Bulletin,* Echelon, Apr. 1997, pp. 1–22.

"Plexeon Logistics, Inc., Power Line Communications", www.plexeon.com/power.html, 2 pages.

"EMETCON Automated Distribution System: Communications Guide", *Westinghouse ABB Power T & D Company Technical Manual 42–6001A,* Sep. 1989, 55 pages.

Abraham, K.C. et al., "A Novel High–Speed PLC Communication Modem", *IEEE Transactions on Power Delivery,* 1992, 7(4), 1760–1768.

J.M. Barstow., "A Carrier Telephone System for Rural Service", *AIEE Transactions,* 1947, 66, 301–307.

Chang, S.S.L., "Power–Line Carrier", *Fundamentals Handbook of Electrical and Computer Engineering,* VolumeII–Communication, Control, Devices and Systems, John Wiley & Sons, 617–627.

Chen, Y–F. et al. "Baseband Transceiver Design of a 128–Kbps Power–Line Modem for Household Applications", *IEEE Transactions on Power Delivery,* 2002, 17(2), 338–344.

Coakley, N.G. et al, "Real–Time Control of a Servosystem Using the Inverter–Fed Power Lines to Communicate Sensor Feedback", *IEEE Transactions on Industrial Electronics,* 1999, 46(2), 360–369.

Esmailian, T. et al., "A Discrete Multiton Power Line Communication System", *Department of Electrical and Computer Engineering,* University of Toronto, Ontario Canada, 2000 IEEE, pp. 2953–2956.

Kawamura, A. et al., "Autonomous Decentralized Manufacturing System Using High–speed Network with Inductive Transmission of Data and Power", *IEEE,* 1996, 940–945.

Kilbourne, B. "EEI Electric Perspectives: The Final Connection", www.eei.org/ep/editorial/Jul–01/0701conenct.htm, 7 pages.

Kim, W–O., et al., "A Control Network Architecture Based on EIA–709.1 Protocol for Power Line Data Communications", *IEEE Transactions on Consumer Electronics,* 2002, 48(3), 650–655.

Lim, C.K. et al., "Development of a Test Bed for High–Speed Power Line Communications", School of Electrical and Electronic Engineering, Nanyang Technological University, Singapore, *IEEE,* 2000, 451–456.

Lokken, G. et al., "The Proposed Wisconsin electric Power Company Load Management System Using Power Line Carrier Over Distribution Lines", *1976 National Telecommunications Conference, IEEE,* 1976, 2.2–12.2–3.

Marthe, E. et al., "Indoor Radiated Emission Associated with Power Line Communication Systems", *Swiss Federal Institute of Technology Power Systems Laboratory IEEE,* 2001, 517–520.

Naredo, J.L. et al., "Design of Power Line Carrier Systems on Multitransposed Delta Transmission Lines", *IEEE Transactions on Power Delivery,* 1991, 6(3), 952–958.

Nichols, K., "Build a Pair of Line–Carrier Modems", *CRC Electronics–Radio Electronics,* 1988, 87–91.

Okazaki, H, et al., "A Transmitting, and Receiving Method for CDMA Communications Over Indoor Electrical Power Lines", *IEEE,* 1998, pp. VI–522–VI–528.

B. Don Russell, "Communication Alternatives for Distribution Metering and Load Management", *IEEE Transactions on Power Apparatus and Systems,* 1980, vol. PAS–99(4), pp. 1448–1455.

Sado, WN. et al., "Personal Communication on Residential Power Lines– Assessment of Channel Parameters", *IEEE,* 532–537.

International Search Report dated May 2, 2001, from PCT/US01/01810.

International Search dated Jul. 16, 2001, from PCT/US01/12699.

International Search Report dated Oct. 22, 2001, from PCT/US01/12291.

International Search Report dated Jun. 5, 2002, from PCT/US01/48064.

Written Opinion dated May 15, 2002, from PCT/US01/12699.

International Search Report dated Jun. 24, 2002, from PCT/US02/04310.

International Search Report dated Aug. 7, 2002, from PCT/US02/04300.

Written Opinion dated Mar. 21, 2003, from PCT/US02/04300.

* cited by examiner

Figure 1 - Prior Art

METHOD AND APPARATUS FOR PROVIDING INDUCTIVE COUPLING AND DECOUPLING OF HIGH-FREQUENCY, HIGH-BANDWIDTH DATA SIGNALS DIRECTLY ON AND OFF OF A HIGH VOLTAGE POWER LINE

CROSS REFERENCE TO RELATED APPLICATIONS

This application is a continuation of Ser. No. 09/912,633, filed Jul. 25, 2001, which claims priority under 35 U.S.C. § 119(d) from provisional application No. 60/268,578 filed Feb. 14, 2001. The entirety of each is incorporated herein by reference.

FIELD OF THE INVENTION

The present invention is concerned with the field of transmitting and receiving high frequency, high bandwidth signals safely and efficiently over power lines. An exemplary system comprises a power line coupler of the present invention, a fiber optic isolator and a communications interface to various media. More specifically, the present invention is drawn to a method and apparatus for coupling to a high voltage power line for transmitting and receiving high frequency, high bandwidth signals.

BACKGROUND

With well-established power distribution systems (PDSs) already in place throughout much of the world, an efficient power line communication system (PLCS) could provide more users with high-speed telecommunications access with the minimum investment of "add-on" devices.

The infrastructure for providing broadband Internet access is presently insufficient to meet demand. A power distribution system (PDS), however, could be an ideal vehicle for carrying communications signals in order to meet this demand. Development of a power line communication system (PLCS) would therefore provide more users with high-speed telecommunications access. Since the PDS is already built, the time required to implement a PLCS would be minimal.

Of course, there are a series of problems to be overcome before a PDS can be used as an efficient, high-speed power line communications medium. The following issues, while not exhaustive, are representative considerations of what such a system would require in order to use an existing PDS to transport communication data: a sufficient signal to noise ratio; non-disruptive installation of the "add on" device; safety means such that users and circuitry are protected and isolated from stray current; a signal carrier with a frequency sufficient to support high data transfer rate (e.g. 10 Mbps); means for the data signal to bypass a distribution transformer without loss; bi-directional data transmission; coupling devices that do not interfere with data signal handling; an independent power source for electronic conditioning circuitry at power line interfaces; a power line interface that is impervious to extreme environmental conditions; and means for the data to be readily routed to intended locations without loss.

Given the advantages of being able to use the existing PDS for high-speed data communication, an effective method is required to couple and decouple the signals onto and off of a high or medium voltage power line. The coupling and decoupling of the data signal must be at a level sufficient to maintain an adequate signal to noise ratio in order to discern between the data signal and noise or interference on the line. For any method developed, a significant challenge lies in being able to mitigate the adverse effects of the high voltage 50–60 Hz power signal might have on the communications signal.

Whyte, et al. in U.S. Pat. No. 4,142,178 observe: "The use of the distribution network conductors for the transmission of carrier communication signals presents many problems not encountered in high voltage transmission line communication systems. Some of these problems include the poor high frequency impedance characteristics and the high level of electrical noise present on the distribution network conductors which, along with the plurality of distribution transformers and power factor correction capacitors attached to the distribution network, rapidly attenuate the communication signals."

Whyte teaches using a direct circuitry from a line coupler to a remote data terminal thus bypassing the PDS transformer, which is the primary source of data attenuation. The main use for the transmission of communication signals addressed by Whyte was to perform distribution functions such as automatic reading of utility meters and selective load control. Those functions are still desirable, but the function of high speed, high bandwidth communication transmission preclude direct connection from a transformer to remote data terminals economically.

Use of a low voltage power distribution system as a data communications carrier within a premises is well known. Abraham, U.S. Pat. No. 6,014,386 teaches a communications network within a building using the AC wiring as the infrastructure of the network. Different types of appliances using digital signals may be included within the network. The Abraham patent uses an impedance matching scheme to direct a specific signal to a specific location. Couplers at a control location have unique impedances that are matched by corresponding couplers elsewhere within the building. Thus, specific signals will be de-coupled based an impedance match. Abraham also teaches the use of dielectric inductors in circuit with capacitors to tune the impedance characteristics of couplers.

In a similar manner, Abraham in U.S. Pat. No. 5,625,863 teaches the distribution of multiple video signals distributed within a building using the building's AC wiring as the distribution system. Unique impedance settings direct the signals to unique locations. Abraham in U.S. Pat. No. 5,818,127 describes a distribution system for FM signals within a building by use of the building's AC wiring.

Abraham in U.S. Pat. No. 5,717,685 describes the coupling of data signal on and off a building's AC wiring infrastructure. His invention uses capacitive circuits in serial connection. The circuitry also includes air-core transformers. This arrangement allows impedance tuning of the specific couplers. While Abraham claims a system with a fiber optic source for an input signal in his U.S. Pat. No. 6,014, 386, there is no description as to the use of fiber optic isolators.

Abraham also states that the utility firm may use the communications system to communicate utility meter information over the PDS.

Methods for avoidance of distribution transformers are well known. Perkins in a series of patents including U.S. Pat. No. 4,473,816 teaches a communications signal bypassing a multi-phase power transformer where the signal uses the PDS as a carrier. The signal is bi-directional and uses conductive material to affect the bypass. The invention uses multiple capacitors in parallel to neutralize the coupling impedance. Further, the winding ratio, R, between the primary and secondary windings ratio is maintained in the signal frequency across the signal bypass. Signal carrier frequency is in the 3–10 KHz range. Similarly, Perkins in U.S. Pat. No. 4,473,817 teaches a communications signal bypassing a single-phase power transformer.

Kennon, U.S. Pat. No. 4,644,321 uses a non-intrusive coupler to capture the data signal. Kennon teaches the use of a toroid having a multiplicity of turns of a conductor that is in circuit with an amplifier and receiver. The toroid core is non-conductive. The signal thus inductively de-coupled is amplified and used for a load management and filed configuration utility terminal. The system requires a battery for circuitry management.

Brown, U.S. Pat. No. 5,949,327 teaches the use of transformer bypass by coupling using capacitors connected to the primary and secondary terminals of the step transformer. Brown recognizes the need for multiple couplings at different points within the EDN (Electrical Distribution Network or, as referred to in the present description as PDS). Brown also teaches that the communication system use a high frequency signal carrier technique such as CDMA.

Moore, U.S. Pat. No. 5,210,519, describes a communication system that couples data signal from a transmission source using an inductor and de-couples the data at the receiver. This methodology is applied in a closed network and requires selective de-coupling as opposed to routing of the signal. Further, Moore teaches the use of a second transformer for reversing any inductor core saturation that may have occurred in the data de-coupling. This method requires time division of the data coupler between data coupling and saturation neutralization.

Dzung, European Patent Application EP948143, describes a high voltage power line communication system that combines multiple source data signals, couples the combined signal onto multiple power lines using capacitive coupling and de-couples and demodulates the signals, separating and converting the signals back to the original form at the receiver.

Power lines can be located in areas with extreme environmental conditions. Thus, the mechanical design must ensure proper operation when exposed to these extreme conditions and also maintain the required level of safety. Furthermore, any methods developed should be designed so as to have minimal impact to service of customers during installation.

Public safety is an absolute requirement. Any system using the PDS must isolate the end user (and public in general) from exposure to electric current. The PDS steps medium and high voltage power down to low voltage power (approximately in the 100–240 volt range) using transformers. Transformers are designed to filter out and ground high frequency signals as a safety precaution. Since a high frequency signal carrier is the ideal medium for high bandwidth data transfer, a communications data delivery system needs to circumvent the transformer filtration process while preserving safety protection.

SUMMARY OF THE INVENTION

It is an object of the present invention to provide a power line coupler device for use with a power line communication system (PLCS).

It is another object of the present invention to provide a power line coupler device for use with a high frequency signal carrier sufficient to support high data transfer rates.

It is still another object of the present invention to provide a power line coupler device that operates under the various line voltages within the PDS.

It is yet another object of the present invention to provide a power line coupler device that enables electrical current isolation.

It is still a further object of the present invention to preserve signal to noise ratio for the communications signal.

It is yet a further object of the present invention to preserve signal to noise ratio for the communications signal bi-directionally.

It is another object of the present invention to provide inductive signal coupling in a PDS.

It is a further object of the present invention to provide inductive signal coupling in a PDS where the coupler's core remains unsaturated.

It is a further object of the present invention to provide a power line coupler device that is non-intrusive.

It is still a further object of the present invention to provide a power line coupler device that inductively draws operating power from the power line.

It is a further object of the present invention to provide a power line coupler device that is self-contained It is a further object of the present invention to provide a power line coupler device that is self-contained and is nearly impervious to environmental conditions.

It is another object of the present invention to provide a power line coupler device that uses a toroid inductor to inductively couple and de-couple signals to and from a power line. modulates the signal in a form consistent with transport over a LV power line.

The light signal is converted back to an electronic signal and then coupled onto the LV power line (LV coupler). In an embodiment of the present invention a second isolator is inserted in the system between the second modem and the data router for conversion of the light signal to electrical signal. Additionally the isolator proves an additional layer of safety because of the dielectric quality of the second isolator.

The high speed, high frequency signal is then delivered, over the LV power line to the end user's residence or place of business. A power line interface device (PLID) serves as the gateway between the end user's various data appliances and local area network (LAN) and the high speed data transport.

DETAILED DESCRIPTION OF THE INVENTION

Figure 1:
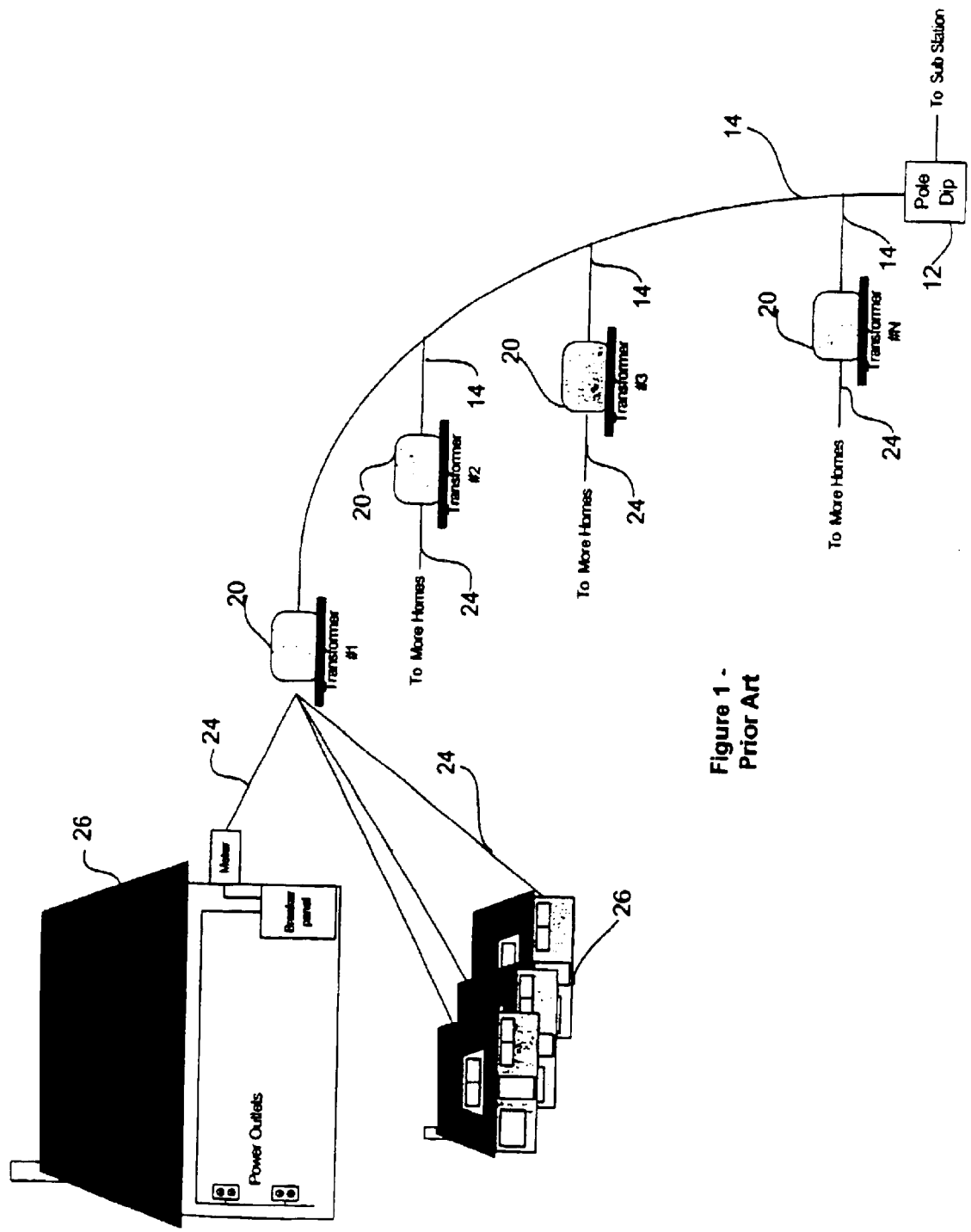
FIG. 1 discloses the typical electric distribution topology of the prior art.

The present invention is a power line coupler device specially suited for

It is yet another object of the present invention to provide a power line coupler device that provides an electronic-to-light transducer to interface with a light conducting isolator.

It is still another object of the present invention to provide a non-intrusive power line coupler device with a hinged power line coupler for ease of installation.

The PDS topology can be used to deliver high-speed communications to residential homes in a cost effective way. Applications for such communication systems include high speed Internet, telephony, video conferencing and video delivery. This recitation of applications is not meant to be exhaustive.

The system involves coupling and de-coupling communications data between a data source and a PDS. High frequency signals allow high bandwidth transfers (the higher the frequency of the data carrier, the more cycles per unit time available for data transfer). The signal carrier should exhibit high signal to noise characteristics relative to the underlying system of a 50 or 60 Hz PDS. (The US standard is 60 Hz, but most countries use a 50 cycle per second power system.)

The data signals are coupled on to and off of the power line with a power line coupler (PLC) device. One embodiment of the present invention uses an inductive method to couple and de-couple data signals off of the power line. A toroid with conductive windings is placed around the power line. This method effectively provides a transformer between the power line and the PLC device circuitry thus facilitating the transmission and receiving of the data signal. For the primary side of the transformer, the number of windings and the orientation of the windings around the magnetic toroid is guided by the desire to maximize the flux linkage.

The type of signal used on this channel can be almost any signal used in communications (CDMA, TDMA, FDM, OFDM to name a few). A wideband signal such as CDMA that is relatively flat in the spectral domain is preferred to minimize radiated interference to other systems while delivering high data rates.

Since communications signals are very high frequency, a step down transformer would filter a signal coupled on the power line. The system to which present invention is a component avoids filtering of high frequency signals by bypassing the transformer with a power line bridge (PLB). The PLB, using a PLC device, de-couples data signals from the medium (MV) or high voltage (HV) line a short distance from a transformer. The PLB interfaces between the power line on the primary of the transformer and the low voltage (LV) line on the secondary of the transformer. (The primary is the side of the transformer where the relatively high voltage enters; the secondary is the side of the transformer where the stepped down, lower voltage exits the transformer.)

The PLB is used to prevent the relatively high voltage from passing to the transformer's secondary side yet allowing the communications signal to pass between the PDS on either side of the transformer. The bypass is accomplished with the use of an isolator. The PLC device includes circuitry to interface with an isolator. A preferred embodiment of the system of which the present invention is a component is to use an optical medium as an isolator.

The de-coupled signal from the relatively high voltage power line is converted to light energy (i.e. light signal) by using a transducer and transmitting the light signal over a non-electrically conductive but light conductive medium.

A preferred embodiment of the present system uses a fiber optic cable as the isolator. The isolator is a light pipe that bypasses the transformer. Fiber optic cable is a dielectric thus insulating the PDS on the secondary transformer side from relatively high voltage.

As described in a companion application by the present inventor, application Ser. No. 09/835,532 filed Apr. 16, 2001, the signal is next modulated and de-modulated by a first modem. The signal goes through a data router and then a second modem. The router serves the purpose of matching data packets with specific messages and destinations. The second modem modulates and de-coupling and de-coupling high frequency, broadband signals carried over power lines within a power distribution system. The PLC device includes the coupler and circuitry necessary to condition the signal, to handle bi-directional signal transfer, to enable the use of an isolator, to be self-contained and to be able to provide operational power from the power line. The PLC device is part of an overall power line communication system (PLCS) which incorporates the present invention and other, companion inventions from the same inventor. The following description is a description of the PLCS in general. The PLC device embodiment is included in the system description. The description pertinent to the PLC device should be apparent to one skilled in the art.

Referring to FIG. 1, the typical electric distribution topology of the prior art is illustrated. Medium voltage (MV) half loop power delivery system, as illustrated, is common to the US PDS. Many transformers are used. Each transformer services a few homes or small businesses. Many other countries, such as the European states, use a high voltage delivery system with many end users serviced from a transformer. The present invention is applicable to either environment.

The power line communication system may be implemented in a high voltage and medium voltage environment (i.e. 1–100 kVAC). For purposes of this description and claims, the high and medium voltage portion of the PDS is described as primary voltage (PV). The low voltage portion of the system is described secondary voltage (SV). These terms are arbitrary but used to improve clarity of the description. Similarly, the side of a transfer where the PV line enters is called the "primary" side. The SV side of the transformer is referred to as the "secondary" side of the transformer.

A sub-station 10 delivers PV power to a half loop distribution point, pole dip 12. The power is delivered in parallel to multiple transformers 20 over a PV power line 14. After the transformer is stepped down to a SV power (in the range of 100 to 240 VAC), several end user premises 26 are serviced via a SV power line 24. The step down transformer 20 grounds high frequency signals for safety purposes. Since a high data transfer (high bandwidth) power line communication delivery system requires a high frequency signal carrier, an object of the present invention is to avoid the removal of the high frequency signal by the transformer 20. It is noted that the PV power lines 14 may be above ground or subterranean. The transformers 20 may be aerial mounted on a pole or pad mounted on the ground.

Figure 2:
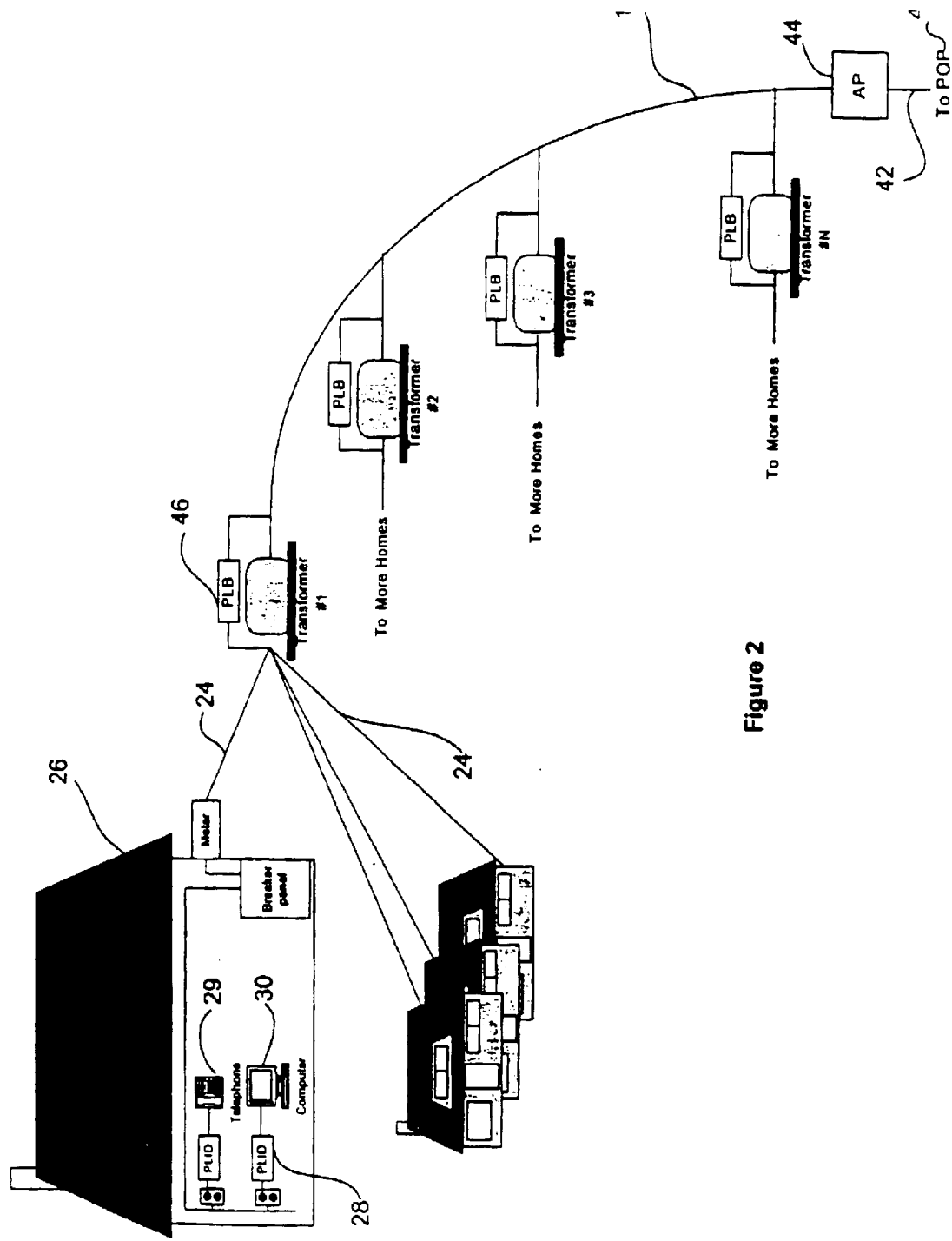
FIG. 2 illustrates typical electric distribution topology modified for communication in accordance with the present invention.

FIG. 2 illustrates the typical electric distribution topology as shown in FIG. 1 as modified for communication in accordance with the present system. A point of presence 40 (POP), the gateway for high frequency, high bandwidth data signal, provides communications with digital providers. It both sends and receives data to the end user over the PDS. A backhaul link 42 connects the POP 40. Data is manipulated and coupled and de-coupled from the PV power line at an aggregation point 44 (AP). A more detailed description of the AP follows in the FIG. 3 discussion.

The PDS is viewed as having three channels: PV power line; SV power line; and the premise's wiring. The first channel (the PV cable) has the least amount of noise and least amount of reflections. This channel has the highest potential bandwidth for communications. This is important because it is the channel that concentrates all of the bandwidth from the other channels. The type of signal used on this channel can be almost any signal used in communications (CDMA, TDMA, FDM, OFDM to name a few). A wideband signal such as CDMA that is relatively flat in the spectral domain is preferred to minimize radiated interference to other systems while delivering high data rates.

The second channel (SV line from the transformer to the premise) and third channel (premise wiring) have noise present from electrical appliances and reflections due to the "web" of wires. These channels support a lower bandwidth than the PV channel and they need a more intelligent (with more overhead) modulation scheme. There are several companies with chip sets to achieve good communications for local area networks (LANs) such as: Adaptive Networks (Newton, Mass.), Inari (Draper, Utah), Intellion (Ocala, Fla.), DS2 (Valencia, Spain) and Itran (Beer-Sheva, Israel). These devices would work well for the SV and premise channels.

Data signal and power are carried over the PV power line 14 as previously stated. A power line bridge 46 (PLB) allows the data signal to bypass the transformer 20 thus avoiding the grounding of the high frequency data signal. More description of the PLB follows in the FIG. 4 description. The data signal after manipulation is delivered to the end user's premise. The data signal enters premise via the SV wiring. The end user may have a local area network (LAN) or have individual digital appliances.

In one embodiment of the present system, the signal is carried through the premise's wiring 24 and is available to various digital appliances 29, 30, including PC's, by a power line interface device 28 (PLID). The PLID 28 plugs into a standard electrical socket and allows the digital appliance to send and receive digital data. An alternative embodiment as described later, uses a communications interface located outside of the premise and the data signal is directly fed to the premise.

Figure 3:
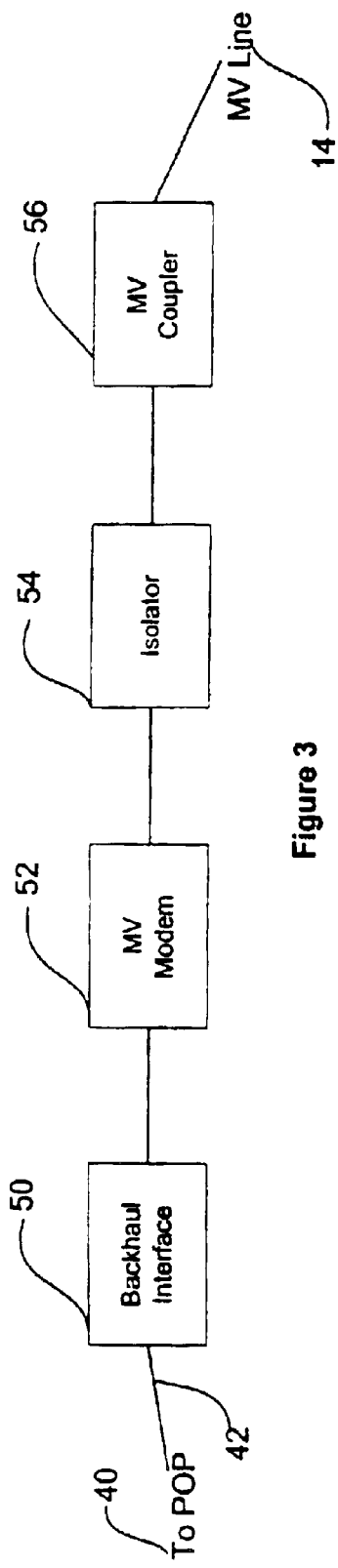
FIG. 3 illustrates a block diagram of the AP in accordance with the present invention.

Referring next to FIG. 3, a block diagram of the AP 44 in accordance with the present invention is illustrated. The AP 44 is the point where digital data is coupled and de-coupled to the PV power line. Additionally, the data is processed so that it can be readily communicated. Data signal communication to and from POP 40 is provided by the backhaul link 42.

A backhaul interface 50 allows direct communication with POP 40. The signal is passed through a high or medium voltage signal modem 52 (PV modem). An isolator 54 is used to prevent electric current from flowing between the PDS and the components leading to the POP 40. The isolator 54 is made from dielectric material. The isolator, in a preferred embodiment of the present system, is a fiber optic light pipe. More description of the isolator and its components occurs in the description referring to FIG. 6.

The isolator 54 bridges between the PV modem 52 and a power line coupler 56. The PV modem 52 within the AP 44 conditions the signal for transmission over the PV power line 14. When data is transmitted by the end user and is de-coupled off of the PV power line, the PV modem 52 conditions the signal for transmission back to the POP 40.

In one embodiment of the present system, the power line coupler 56 comprises, along with other components, an inductor having a toroid (donut-like) shaped core. The toroid core has permeability qualities to improve signal to noise ratio. More description of a preferred embodiment for the power line coupler is presented below. The inductor couples and de-couples a high frequency signal to and from the power line without invading the power line. Once the data signal has been coupled to the PV power line, it is transported on the PV power line 14.

Figure 4:
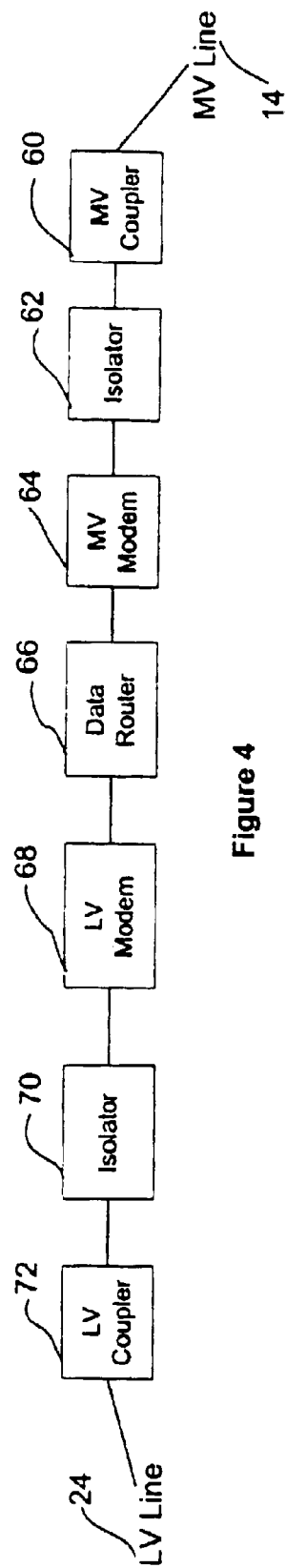
FIG. 4 illustrates a block diagram of the PLB in accordance with the present invention.

Referring to FIG. 4, a block diagram of the PLB in accordance with the present system is illustrated. The PLB 46 bypasses the transformer 20 linking the data signal between the PV power line and the SV power line. At either end of the PLB 46 is a coupler. A PV coupler 60 couples and de-couples signal with a PV power line 14. A SV coupler 72 couples and de-couples signal with a SV power line 24.

An isolator is present between the PLB end couplers 60, 72 and the interior of the PLB 46. The isolators, a PV isolator 62 and a SV isolator 70, are composed of dielectric material and insulate the balance of the PLB from potential electrical damage and user injury. A preferred embodiment of the isolator uses fiber optic material. The isolator is discussed in more detail below.

A PV modem 64 modulates and de-modulates the signal to and from the PV isolator. The PV modem conditions the high frequency signals for transmission over the PV power line 14. The SV modem 68 conditions the signal for communication over a SV power line. In one embodiment of the present invention, a data router 66 is between the SV modem 68 and the PV modem 64. The function of the data router 66 is to prioritize and gather packets from all of the devices on SV power line side PV power line side. The data router 66 provides data packet management of end user transmission.

The signal (going to the end user) is coupled onto the SV power line by the SV coupler 72. The SV power line 24 delivers the power service to an end user premise 26. A "web" of wires distributes power and signal within the premise. The user draws power on demand by plugging an appliance into a power outlet. In a similar manner, the user may use a power line interface device 28 (PLID) to digitally connect data appliances, receiving and sending data signals carried by the power wiring.

A PLID 28 can have a variety of interfaces to the subscriber's equipment 30, 32. Some examples are RJ-11 Plain Old Telephone Service (POTS), RS-232, USB, and 10 Base-T. A subscriber can have more than one interface device 28 on the same premise wiring.

Figure 5:
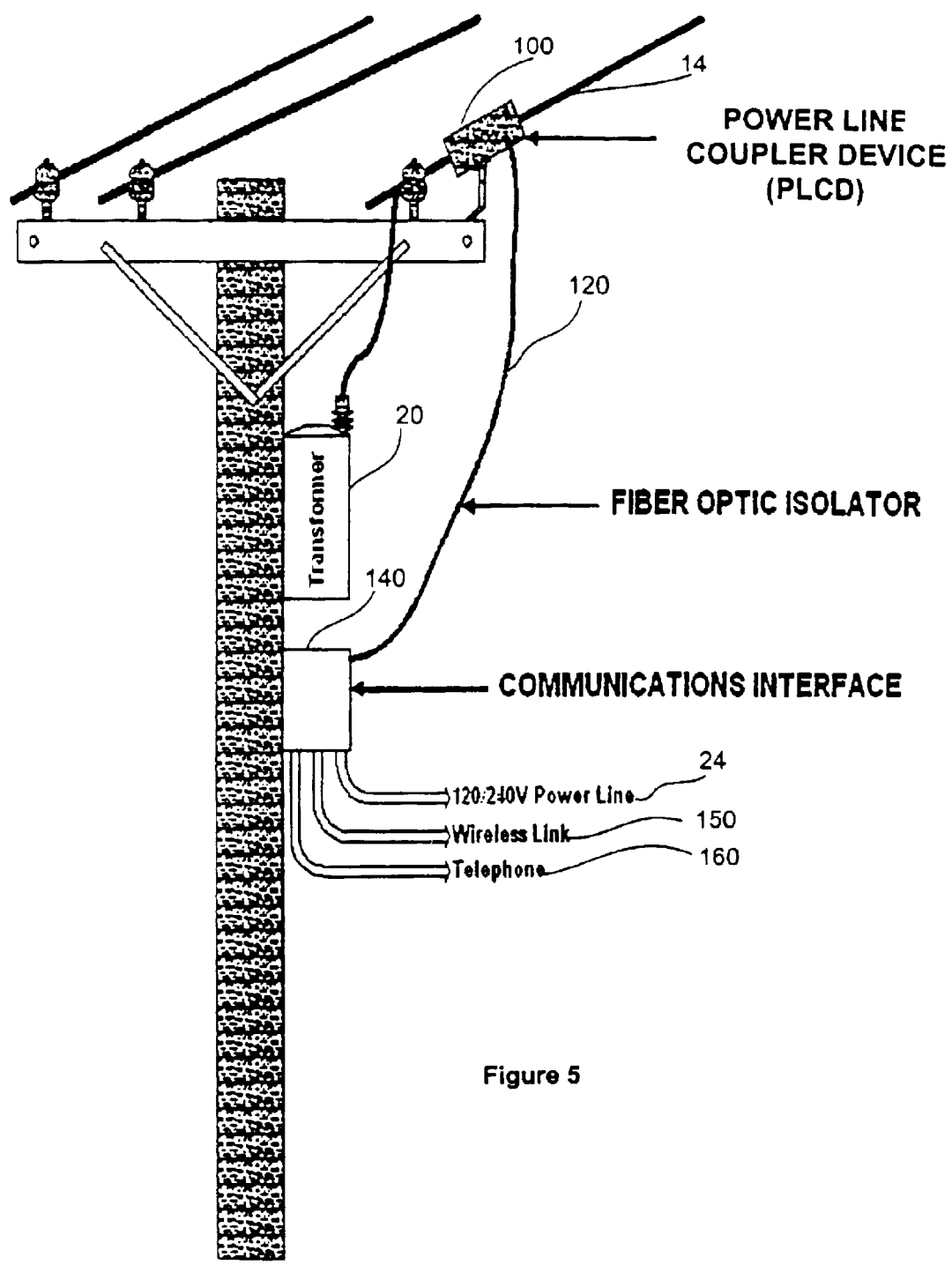
FIG. 5 illustrates a conceptual diagram of a power line coupling in accordance with one embodiment of the present invention.

Referring to FIG. 5, a conceptual diagram of a power line coupler device in accordance with one embodiment of the present invention is illustrated. The description of the system includes a PLB 46. The embodiment conceptualized in FIG. 5 replaces the PLB 46 with a self-contained power line coupler device 100, a fiber optic isolator 130 and a communications interface 140. Further, the transformer 20 is depicted as pole mounted. The Communications Interface 140 separates signal carried over the PV power line 14 into three components: SV power line 24; wireless link 150; and telephone line 160, although this is not meant as a limitation.

Figure 6:
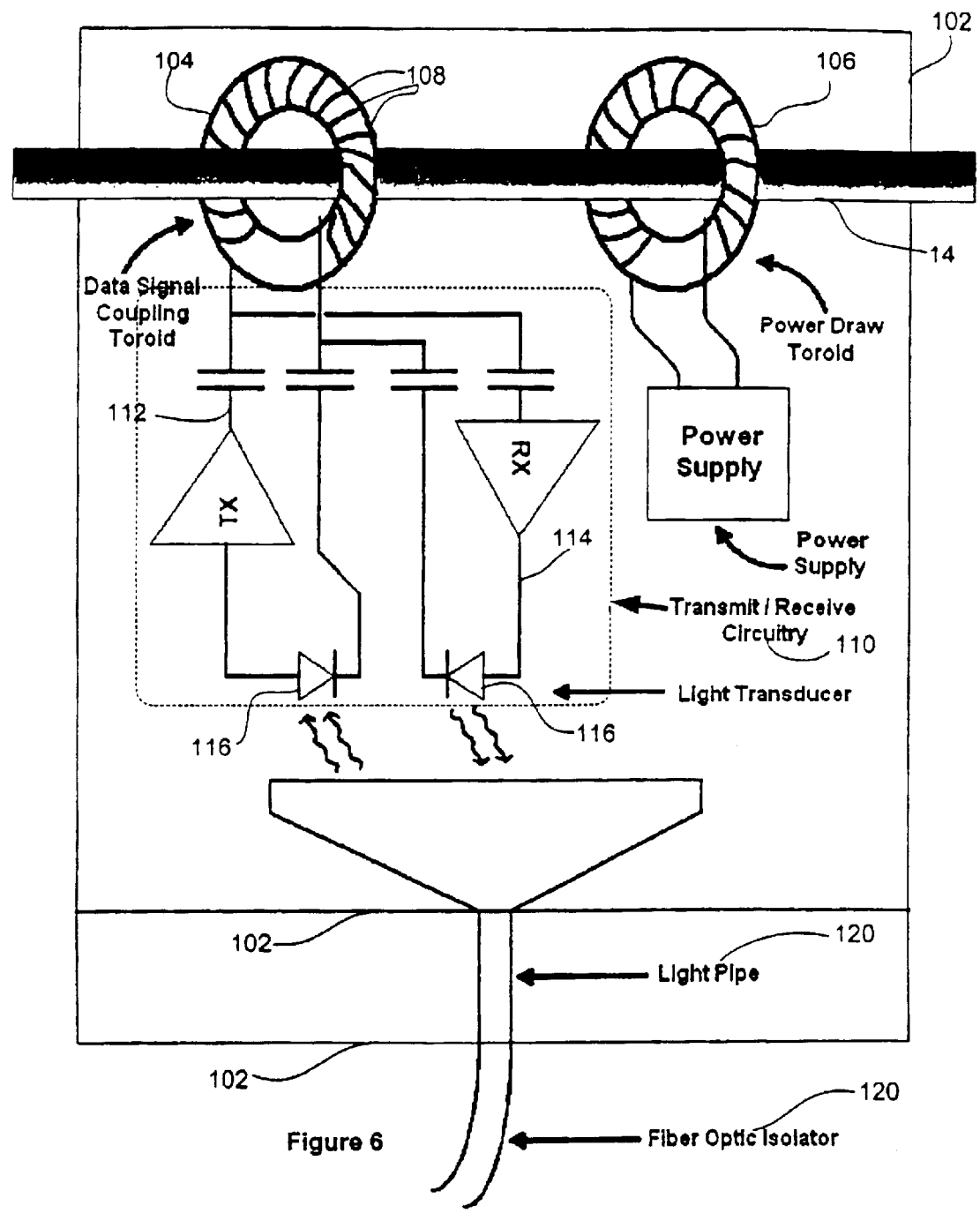
FIG. 6 illustrates a diagram of a self-contained power line coupling in accordance with one embodiment of the present invention.

Referring to FIG. 6, a diagram of a self-contained power line coupler device in accordance with one embodiment of the present system is illustrated. The self-contained power line coupler device is packaged in a weatherproof housing 102 to militate against harsh weather and environment conditions. The PV power line 14 passes through openings in the container. A data signal coupler 104 couples and de-couples data signals transported by the PV power line 14. One embodiment of the present invention uses a magnetic toroid shaped inductor. Windings 108 are placed around the inductor 104 to facilitate flux linkage of the data signal. The number of windings and the winding orientation is selected to maximize flux linkage. The permeability of the magnetic core is chosen for maximum coupling with the high frequency data signal. Core permeability characteristics prevent low frequency power line signal saturation of the toroid core. If the inductor coupler 104 becomes saturated with low frequency signal, the coupler would lose its ability to couple or de-couple high frequency signal. Low frequency, as used in this description and claims, are frequencies in the range of 1–100 Hz, typically 50–60 Hz.

The toroid 104 has direct electrical connection to the signal conditioning electronics used for transmitting and receiving the data signal. Transmit and receive circuitry 110 carries data signal to signal conditioning electronic components. As depicted in FIG. 6, the transmit circuitry 112 and the receive circuitry 114 are in parallel. Another embodiment of the present invention uses two data signal coupling toroids. One coupler is used for receiving and one for transmitting in order to optimize the flux linkage for the two cases. (FIG. 6, however, depicts only a single signal coupler.)

The design of the transmit side is done to maximize the power of the drive signal in order to keep the signal to noise ratio of the coupled signal at least to the level acceptable for the overall communications system. The receive side contains a low noise amplifier designed to handle the lowest acceptable transmit signal level of the system. At a system level, the modulation and signaling scheme is done to minimize interference between transmit and receive signals.

The signal conditioning circuitry communicates with the fiber optics interface via an electronic/light transducer 116. Laser diodes may be used to implement a light transducer. The transducer converts electrical signal to light signal in the receive circuitry 114. The transducer converts light signals to electrical signals in the transmit circuitry 112. The light signal is transmitted to and from a light pipe 130 (fiber optic cable). The data signals are communicated back and forth between the power line coupler 100 and the Communications Interface 140 via a fiber optic cable 130. The Fiber Optic Isolator breaks any electrical path between the two devices thus providing safety for the system.

With the power line coupler device being a "closed" system, power for the electronics must be derived internally. Batteries may be an option but replacement would be costly and impractical. In one embodiment of the power line coupler device, a power draw toroid 106 is provided. The power draw toroid 106 has magnetic characteristics appropriate for coupling low frequency signals, thus inductively drawing some of the power off of the power line and providing a power supply 118 for the power line coupler device.

For additional safety, the power line couple device external shell or housing 102 is constructed from dielectric, corrosive resistant, weatherproof materials and is designed to significantly reduce any possible exposure to the high voltage potential present on the power line. The Fiber Optic Isolator 130 is the only connection between the power line coupler device 100 and the communications interface 140. Further, the light pipe is encased in the insulated housing 102. The first priority of the housing 102 is to protect from exposure to the high voltage potential. It is also designed to ensure proper operation under extreme environmental conditions. The external shell is assembled using fasteners including adhesives. The assembled shell is sealed with a dielectric, weatherproof sealant around any seams, fasteners, and power line and conduit openings. Sealing enhances the weatherproofing.

In another embodiment of the present invention, a "hinged" toroid design allows for easy installation and minimal impact to customer service. The toroids, one or two coupling toroids and a power supply toroid, simply snap around the power line using existing utility tools and techniques.

The communications interface 140 communicates with the power line coupling device 100 via the fiber optic isolator 130. Received signals are separated into digital data signals and any other communication signal that may be carried by the PV power line. FIG. 5 depicts three types of leads from the communications interface: 120/240V power line 24 (SV power line); wireless link 150; and telephone link 160. The SV power line receives current from the transformer 24. The digital data signal is coupled on and off the SV power line 24 within the communications interface.

The description of one embodiment of the present system including a PLB 46 for providing a means for converting light signals to coupled digital data signals as delivered to a premise over SV power line has been made. The communications interface implements the coupling and de-coupling of digital data signal on and off the SV power line in a similar fashion.

A system as disclosed herein is useful to provide data services to the residential market place at 10 Mbps. This makes an entire new range of applications practically available. Each device connected to the PLID would (if desired) have an address and would be accessible remotely. Some examples include broadband Internet access, remote utility meter reading, Internet Protocol (IP)-based stereo systems, IP-based video delivery systems, and IP telephony.

The present system and the present invention have been described in terms of preferred embodiments. However, it will be appreciated that various modifications and improvements may be made to the described embodiments without departing from the scope of the invention.

What is claimed is:

1. A method for communicating high-frequency data signals through power lines comprising:

de-coupling first data signals representing first data from the power line by inductance;

conditioning the first data signals to provide the first data;

coupling the first data to a first end of a fiber optic cable that is sufficient to isolate power line voltages if such voltages are conducted to the fiber optic cable;

receiving second data from the fiber optic cable;

conditioning the second data to form second data signals; and coupling the second data signals to the power line by inductance.

2. The method of claim 1, wherein the step of conditioning the first data signals comprises demodulating the first data signals.

3. The method of claim 2, wherein the step of conditioning the second data comprises modulating at least one carrier signal with the second data.

4. The method of claim 3, wherein said step of de-coupling the first data signals from the power line employs a magnetically permeable core and a winding traversing through said core.

5. The method of claim 4, wherein said core is disposed substantially around the entire circumference of the power line and comprises a first portion and a second portion connected together, at least in part, via a hinge.

6. The method of claim 3, wherein said at least one carrier signal has a frequency greater than one hundred hertz.

7. The method of claim 6, wherein said first and second data signals are modulated using Orthogonal Frequency Division Multiplexing (OFDM).

8. The method of claim 6, wherein said first and second data signals are comprised of broadband signals.

9. The method of claim 6, wherein said first data comprises telephony data.

10. The method of claim 6, wherein said first data comprises Internet data.

11. The method of claim 7, wherein said first data comprises telephony data.

12. The method of claim 1, wherein said first data comprises telephony data.

13. A method for communicating data over a power line, comprising:
de-coupling a first data signal comprising first data from the power line by inductance;
demodulating said first data signal;
transmitting said first data through a fiber optic cable that is sufficient to isolate power line voltages if such voltages are conducted to the fiber optic cable;
receiving second data from the fiber optic cable;
modulating at least one carrier signal with the second data to provide a second data signal; and
coupling said second data signal to the power line by inductance.

14. The method of claim 13, wherein said coupling is performed by a magnetically permeable core and a winding traversing through said core.

15. The method of claim 13, wherein the fiber optic cable forms at least part of a data path to the Internet.

16. The method of claim 15, wherein the fiber optic cable forms at least part of a data path to a point of presence.

17. The method of claim 13, wherein said first data is transmitted to the Internet.

18. The method of claim 13, wherein said modulated second data is transmitted over the power line using an Internet Protocol.

19. The method of claim 18, wherein said first data is received from the power line in an Internet Protocol.

20. The method of claim 13, wherein said first data is telephony data.

21. The method of claim 19, wherein said first data is video data.

22. The method of claim 19, wherein said first data is power usage data.

23. The method of claim 13, wherein said second data is modulated using Orthogonal Frequency Division Multiplexing (OFDM).

24. The method of claim 13, wherein said first data signals are comprised of broadband signals.

25. The method of claim 13, wherein said first data is transmitted through the fiber optic cable at a rate of at least ten megabits per second.

26. The method of claim 13, wherein said second data is transmitted at a rate of at least ten megabits per second over the power line.

27. The method of claim 13, further comprising receiving power from the power line via inductance.

28. The method of claim 27, wherein said step of receiving power is performed by a magnetically permeable core disposed substantially around the entire circumference of the power line and a winding traversing through said core.

29. The method of claim 13, wherein said at least one carrier signal has a frequency greater than one hundred hertz.

30. The method of claim 13, wherein said step of de-coupling said first data signal from the power line and said step of coupling said modulated second data over the power line comprises using a magnetically permeable core and a winding traversing through said core.

31. The method of claim 14, wherein said core is disposed substantially around the entire circumference of the power line and comprises a first portion and a second portion connected together, at least in part, via a hinge.

32. A method for communicating high-frequency data signals through power lines comprising:
de-coupling first data signals representing first data from the power line by inductance;
conditioning the first data signals to provide the first data; and
coupling the first data to a first end of a fiber optic cable that is sufficient to isolate power line voltages if such voltages are conducted to the fiber optic cable.

33. The method of claim 32, further comprising:
receiving second data from the fiber optic cable;
conditioning the second data to form second data signals; and
coupling the second data signals to the power line by inductance.

34. The method of claim 32, wherein the step of conditioning the first data signals comprises demodulating the first data signals.

35. The method of claim 34, wherein the step of conditioning the second data comprises modulating at least one carrier signal with the second data.

36. The method of claim 35, wherein said step of de-coupling the first data signals from the power line employs a magnetically permeable core and a winding traversing through said core.

37. The method of claim 36, wherein said core is disposed substantially around the entire circumference of the power line and comprises a first portion and a second portion connected together, at least in part, via a hinge.

38. The method of claim 35, wherein said at least one carrier signal has a frequency greater than one hundred hertz.

39. The method of claim 38, wherein said first and second data signals are modulated using Orthogonal Frequency Division Multiplexing (OFDM).

40. The method of claim 38, wherein said first and second data signals are comprised of broadband signals.

41. The method of claim 38, wherein said first data comprises telephony data.

42. The method of claim 38, wherein said first data comprises Internet data.

43. The method of claim 38, wherein said first data comprises telephony data.

44. The method of claim 32, wherein said first data comprises telephony data.

* * * * *

UNITED STATES PATENT AND TRADEMARK OFFICE
CERTIFICATE OF CORRECTION

PATENT NO. : 6,950,567 B2
APPLICATION NO. : 10/429338
DATED : September 27, 2005
INVENTOR(S) : Paul A. Kline It is certified that error appears in the above-identified patent and that said Letters Patent is hereby corrected as shown below:

On the title page, in field (74), under "Attorney, Agent, or Firm", in column 2, line 2, delete "Dension" and insert - - Denison - -, therefor.

Title Page: On page 2, in field (56), under "U.S. Patent Documents", in column 1, line 40, delete "1/1983" and insert - - 1/1963 - -, therefor.

On page 2, in field (56), under "U.S. Patent Documents", in column 2, line 41, delete "12/1994" and insert - - 10/1994 - -, therefor.

On page 2, in field (56), under "U.S. Patent Documents", in column 2, line 53, after "4,749,992" delete "A" and insert - - B1 - -, therefor.

On page 3, in field (56), under "U.S. Patent Documents", in column 1, line 55, delete "703/18" and insert - - 703/018 - -, therefor.

On page 3, in field (56), under "U.S. Patent Documents", in column 2, line 27, delete "Lukanek et al." and insert - - Brandt et al. - -, therefor.

On page 4, in field (56), under "U.S. Patent Documents", in column 1, line 3, delete "375/329" and insert - - 375/303 - -, therefor.

On page 4, in field (56) under "U.S. Patent Documents", in column 1, line 14, delete "310/310.06" and insert - - 340/310.06 - -, therefor.

On page 5, in field (56) under "Other Publications", in column 1, lines 48 - 49, delete "©2002,IEEE" and insert - - ©2002 IEEE - -, therefor.

On page 5, in field (56), under "Other Publications", in column 2, line 23, delete "kurozuc_vol8" and insert - - kurozu/c_vol8 - -, therefor.

On page 6, in field (56), under "Other Publications", in column 1, line 13, delete """ before "Plexeon".

UNITED STATES PATENT AND TRADEMARK OFFICE
CERTIFICATE OF CORRECTION

PATENT NO.        : 6,950,567 B2
APPLICATION NO. : 10/429338
DATED               : September 27, 2005
INVENTOR(S)      : Paul A. Kline It is certified that error appears in the above-identified patent and that said Letters Patent is hereby corrected as shown below:

On page 6, in field (56), under "Other Publications", in column 1, line 13, insert - - " - - before "Power".

On page 6, in field (56), under "Other Publications", in column 1, line 24, after "Engineering" insert - - " - -.

On page 6, in field (56), under "Other Publications", in column 1, line 31, delete "et al," and insert - - et al., - -, therefor.

In column 2, line 16, after "signals" delete "."" and insert - - ". - -, therefor.

In column 4, line 21, after "self-contained" insert - - . - -.

In column 4, lines 29 - 67, after "power line." delete "modulates the signal in a …………………………..specially suited for".

In column 6, line 10, after "modulates and" delete "de-coupling" and insert - - de-modulates the signal in a form consistent with transport over a LV power line.

The light signal is converted back to an electronic signal and then coupled onto the LV power line (LV coupler). In an embodiment of the present invention a second isolator is inserted in the system between the second modem and the data router for conversion of the light signal to electrical signal. Additionally the isolator proves an additional layer of safety because of the dielectric quality of the second isolator.

The high speed, high frequency signal is then delivered, over the LV power line to the end user's residence or place of business. A power line interface device (PLID) serves as the gateway between the end user's various data appliances and local area network (LAN) and the high speed data transport.

UNITED STATES PATENT AND TRADEMARK OFFICE
CERTIFICATE OF CORRECTION

PATENT NO.         : 6,950,567 B2
APPLICATION NO. : 10/429338
DATED                  : September 27, 2005
INVENTOR(S)         : Paul A. Kline It is certified that error appears in the above-identified patent and that said Letters Patent is hereby corrected as shown below:

BRIEF DESCRIPTION OF DRAWINGS

FIG. 1 discloses the typical electric distribution topology of the prior art.

FIG. 2 illustrates typical electric distribution topology modified for communication in accordance with the present invention.

FIG. 3 illustrates a block diagram of the AP in accordance with the present invention.

FIG. 4 illustrates a block diagram of the PLB in accordance with the present invention.

FIG. 5 illustrates a conceptual diagram of a power line coupling in accordance with one embodiment of the present invention.

FIG. 6 illustrates a diagram of a self-contained power line coupling in accordance with one embodiment of the present invention.

UNITED STATES PATENT AND TRADEMARK OFFICE
CERTIFICATE OF CORRECTION

PATENT NO. : 6,950,567 B2
APPLICATION NO. : 10/429338
DATED : September 27, 2005
INVENTOR(S) : Paul A. Kline It is certified that error appears in the above-identified patent and that said Letters Patent is hereby corrected as shown below:

DETAILED DESCRIPTION OF THE INVENTION

The present invention is a power line coupler device specially suited for coupling - -, therefor.

In column 7, line 21, delete "Intellion" and insert - - Intellon - -, therefor.

In column 12, line 26, in Claim 32, delete "conducted" and insert -- connected --, therefore.

Signed and Sealed this

Nineteenth Day of September, 2006

JON W. DUDAS
*Director of the United States Patent and Trademark Office*